United States Patent [19]
Boyan

[11] Patent Number: 5,521,615
[45] Date of Patent: May 28, 1996

[54] DISPLAY SYSTEM FOR INSTRUMENTS

[75] Inventor: Corydon J. Boyan, Santa Rosa, Calif.

[73] Assignee: Hewlett-Packard Company, Palo Alto, Calif.

[21] Appl. No.: 348,825

[22] Filed: May 8, 1989

[51] Int. Cl.[6] .............................. G09G 5/02; G09G 5/36
[52] U.S. Cl. ..................... 345/150; 345/127; 345/134; 345/140
[58] Field of Search ...................... 340/703, 701, 340/702, 703, 712, 722; 358/28, 39, 10, 27, 80; 364/518, 521, 481; 345/13, 150–155, 132, 134, 140, 127; 348/644, 645, 649

[56] References Cited

U.S. PATENT DOCUMENTS

| | | | |
|---|---|---|---|
| 4,096,523 | 6/1978 | Belmares-Sarabia et al. | 358/80 |
| 4,518,986 | 5/1985 | Hinn et al. | 358/10 |
| 4,694,286 | 9/1987 | Bergstedt | 340/703 |
| 4,695,832 | 9/1987 | Jacobson | 340/703 |
| 4,745,543 | 5/1988 | Michener et al. | 340/722 |
| 4,763,117 | 8/1988 | Blattner et al. | 364/481 |
| 4,796,019 | 1/1989 | Auerbach | 340/712 |
| 4,821,030 | 4/1989 | Batson et al. | 340/712 |
| 4,821,031 | 4/1989 | Roberts | 340/731 |
| 4,896,291 | 1/1990 | Gest et al. | 340/703 |
| 4,914,426 | 4/1990 | Schine | 345/13 |
| 5,012,299 | 4/1991 | Sawamura et al. | 358/80 |
| 5,014,129 | 5/1991 | Imanishi | 345/132 |
| 5,068,651 | 11/1991 | Takebe et al. | 345/132 |

FOREIGN PATENT DOCUMENTS
8200726 3/1982 WIPO .................................. 340/712

*Primary Examiner*—Richard Hjerpe
*Assistant Examiner*—M. Fatahiyar

[57] ABSTRACT

An instrument ("INSTR") hardkey facilitates a change in settings of any instrument displayed in any of the windows that appears on a display. The user merely depresses the "INSTR" key and selects the instrument whose settings are to be changed by a softkey menu that is displayed when the "INSTR" hardkey is depressed. A color editor is preferably resident in the display and provides a superimposed window and softkey menu for enabling the user to adjust colors. An "Adjust Color" softkey allows the user to adjust one or all of six factors: red, green, blue, hue (tint), saturation (color or color level), and luminosity (brightness). The window preferably displays red, green, and blue bars in a bar graph format, which change in height as the user changes the red, green, and/or blue settings by a rotary pulse generator or a numeric keyboard. The window also shows readouts for hue, saturation, and luminosity which change as the user adjusts the values with the rotary pulse generator or the numeric keyboard. The ability to adjust any or all of the six attributes (red, green, blue, hue, saturation, and/or luminosity) enables the user to select any desired color. A method implemented in software, instead of hardware, also provides pixel stretching to the entire display to provide clearer, more refined images.

19 Claims, 6 Drawing Sheets

FIG_1

FIG_2

FIG_4

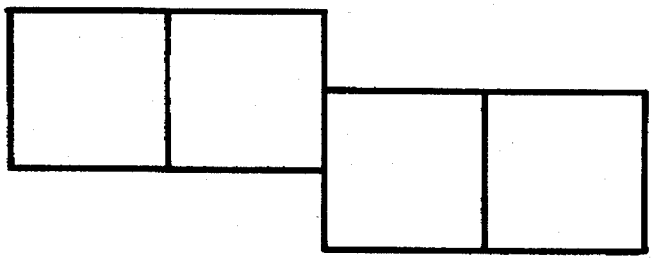
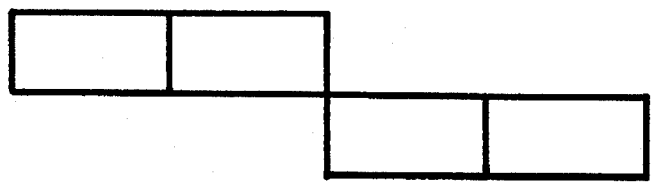
EFFECT OF DOT STRETCHING
FIG_6

DISPLAY SYSTEM FOR INSTRUMENTS

BACKGROUND OF THE INVENTION

This invention relates to electronic systems and, more particularly, to electronic instruments for measuring electrical signals. Specifically, the invention is directed to displays for electronic systems.

In one known instrument, a display is provided which can display as many as four windows. An instrument can comprise a module or a combination of modules. A different instrument state can be displayed in each of the four windows simultaneously. That is, a display of the state of a module or combination of modules can be displayed in each of the four windows concurrently.

Unfortunately, once the different instrument states are displayed, it is very cumbersome to access an individual instrument, that is, a module or combination of modules, to change instrument settings. For example, one exemplary instrument, the HP 70000 series modular measurement system display, the HP 70206A display, available from Hewlett-Packard Company, Signal Analysis Division, Rohnert Park, Calif., requires numerous keystrokes to change instrument settings. Specifically, the user needs to depress the "DISPLAY" hardkey, then push the "Assign Keyboard" softkey, next select the window corresponding to the instrument whose settings are to be changed by means of a numeric keyboard or a rotary pulse generator knob, and depress the "MENU" hardkey to enable the instrument setting softkeys. This operation necessitates an in-depth understanding of the operation of the instrument. This operation also usurps the time to enter many keystrokes irrespective of the level of skill of the user. It is therefore desirable to facilitate the change of instrument settings in such an instrument.

Additionally, many color editors are known. One approach for enabling a user to select a set of colors is to display multiple colors from which the user can choose on the display screen simultaneously, and the user can select colors by codes associated with the colors. Typically, the system sets defaults if the user does not elect to choose the colors. For example, in the case sixteen colors are available, the background can be defaulted to black (0), the graticule can be defaulted to gray (1), the first trace can be defaulted to yellow (2), the second trace can be defaulted to cyan (blue) (3), the third trace can be defaulted to pink (4), and so on up to 16 colors (i.e., colors 0–15). Therefore, color choices and the ability to adjust colors for various reasons, such as the level of ambient light, color blindness of the user, etc., are limited. It is therefore desirable to provide a broader range of color choices for color displays.

Finally, dot or pixel stretching to achieve a clearer, more refined display is known. Previously, however, pixel stretching has been achieved by means of hardware, such as in the HP 70205 and HP 70206 displays, by ORing adjacent pixels. More recently, pixel stretching has been achieved by means of a PAL (program array logic) circuit. However, in both of these instances, only the pixels of traces of data are stretched. It is desirable that pixel stretching be applied to the entire display.

SUMMARY OF THE INVENTION

One embodiment of the present invention provides an instrument ("INSTR") hardkey to facilitate a change in settings of any instrument displayed in any of the windows that appears on a display. The user merely depresses the "INSTR" key and selects the instrument whose settings are to be changed by means of a softkey menu that is displayed when the "INSTR" hardkey is depressed. In the case of a color display, different colors can be employed to show the correspondence between the instruments shown in the windows and the softkey menu instrument choices (i.e., the instrument and corresponding softkey menu selections are color coded). Also, or alternatively, the model number of the instruments shown in the windows can be shown in the softkey menu. Both color coding and model number coding are preferred. Furthermore, in systems where multiple modules having the same model number are employed, the row and column addresses of the modules having the same model number are displayed to distinguish between instruments having the same model number.

One embodiment of the invention also enables the user to adjust the colors of the color display. The color editor is preferably resident in the display. An instrument connected to the display preferably labels softkeys for allowing the user to adjust the colors based upon the instrument actually controlling the display, that is, the module or combination of modules controlling the display determines what aspects of the display are enabled for color adjustment.

When the user selects color adjustment, the display provides a superimposed window and softkey menu for enabling the user to adjust colors. The menus can provide various selections, including the selection of default colors and preferably colors that compensate for various types of color blindness, which are stored in a read only memory. The user also has the softkey menu option to select "Adjust Color."

The "Adjust Color" softkey allows the user to adjust one or all of six factors: red, green, blue, hue (tint), saturation (color or color level), and luminosity (brightness). The window preferably displays red, green, and blue bars in a bar graph format, which change in height as the user changes the red, green, and/or blue settings by means of a rotary pulse generator or a numeric keyboard. The window also shows readouts for hue, saturation, and luminosity which change as the user adjusts the values with the rotary pulse generator or the numeric keyboard. The ability to adjust any or all of the six attributes (red, green, blue, hue, saturation, and/or luminosity) enables the user to select any desired color.

Finally, one embodiment of the invention provides a method implemented in software, instead of hardware, for providing pixel stretching. In accordance with the pixel stretching method of the invention, any pixel stretching can be applied to the entire display to provide clearer, more refined images.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 6 illustrates an example of pixel stretching in accordance with the invention.

DETAILED DESCRIPTION OF THE PREFERRED EMBODIMENTS

Figure 1:
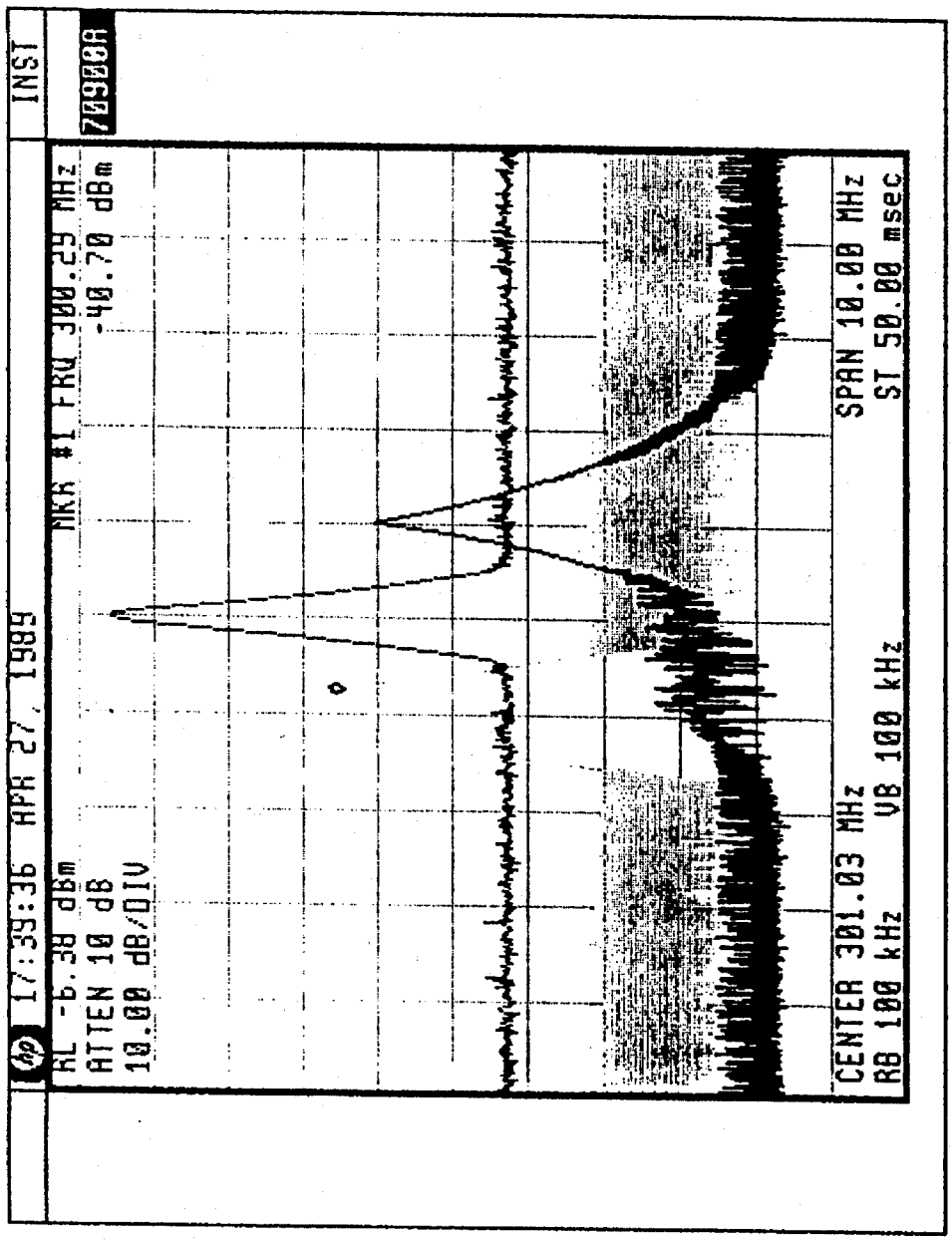
FIGS. 1–3 show example screens for one, two, and four window cases, respectively, useful in describing the "INSTR" key provided in accordance with one embodiment of the invention.

A key not previously provided, the "INSTR" key, is used to move the keyboard between modules on the screen of a modular measurement system display, such as the HP 70004A display.

Previously, it was necessary to enter a menu called "assign keybd" in which a window could be selected by entering the appropriate window number with a numeric keyboard or a rotary pulse generator knob, then depressing MENU again.

The INSTR key allows two-stroke access to any window displayed on-screen, thus greatly easing the burden of controlling instruments in several different windows.

The "INSTR" key functions as follows. When the "INSTR" key is depressed, the display places colored borders around the currently defined windows. The pens used are: window 1, pen 2; window 2, pen 3; window 3, pen 4; window 4, pen 5. Typically, these pens are yellow, cyan, pink, and green, respectively. In the corner nearest the default position of these windows (window 1, lower left, window 2, lower right, window 3, upper left, window 4, upper right), a softkey containing the first seven characters in the label identification for the module is displayed in inverse video in the same color as the associated window border. If any of the labeled softkeys is depressed, a keyboard link is offered to the module corresponding to that window. If the module accepts the link, it is given the keyboard and will put up its menu keys as though the "MENU" key had been depressed.

Figure 2:
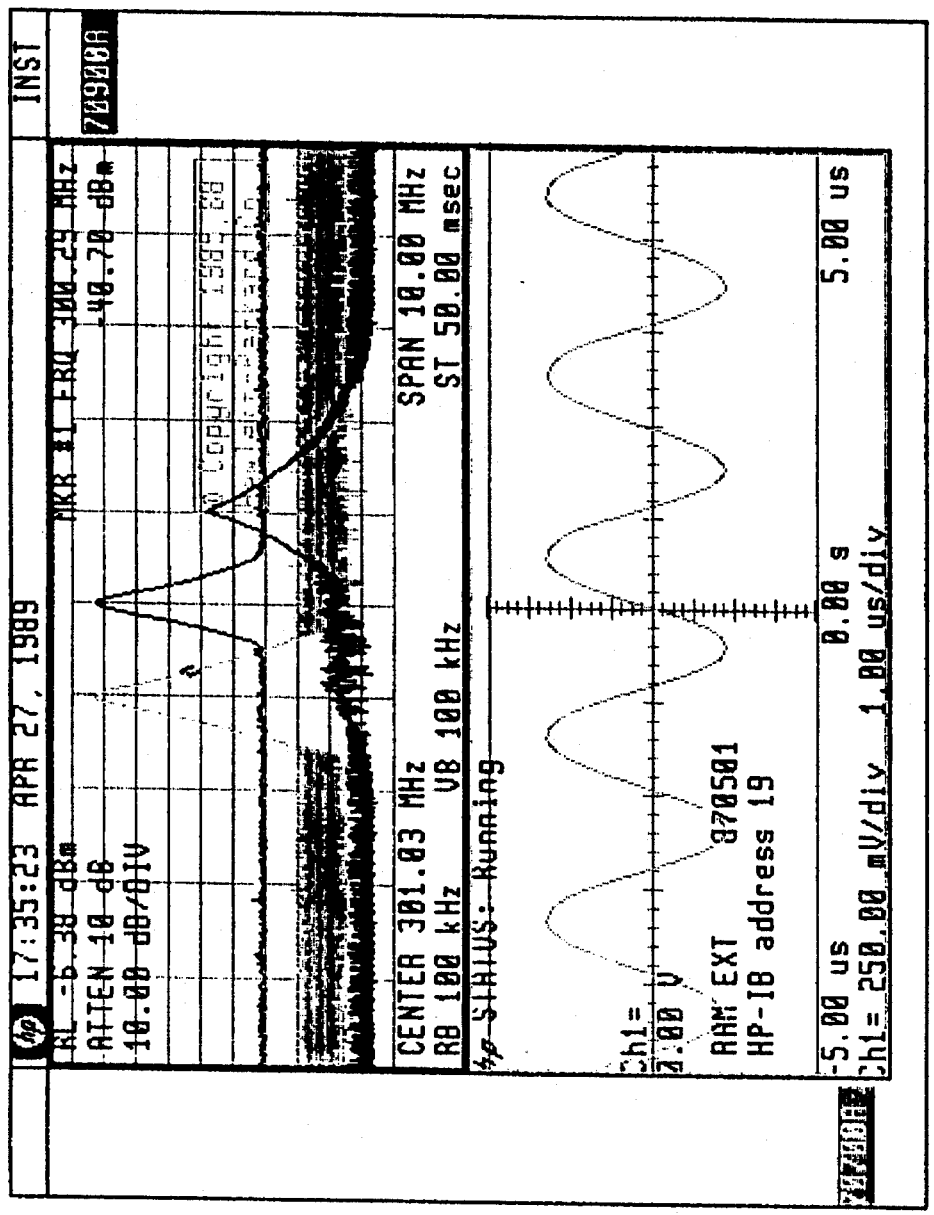
Figure 3:
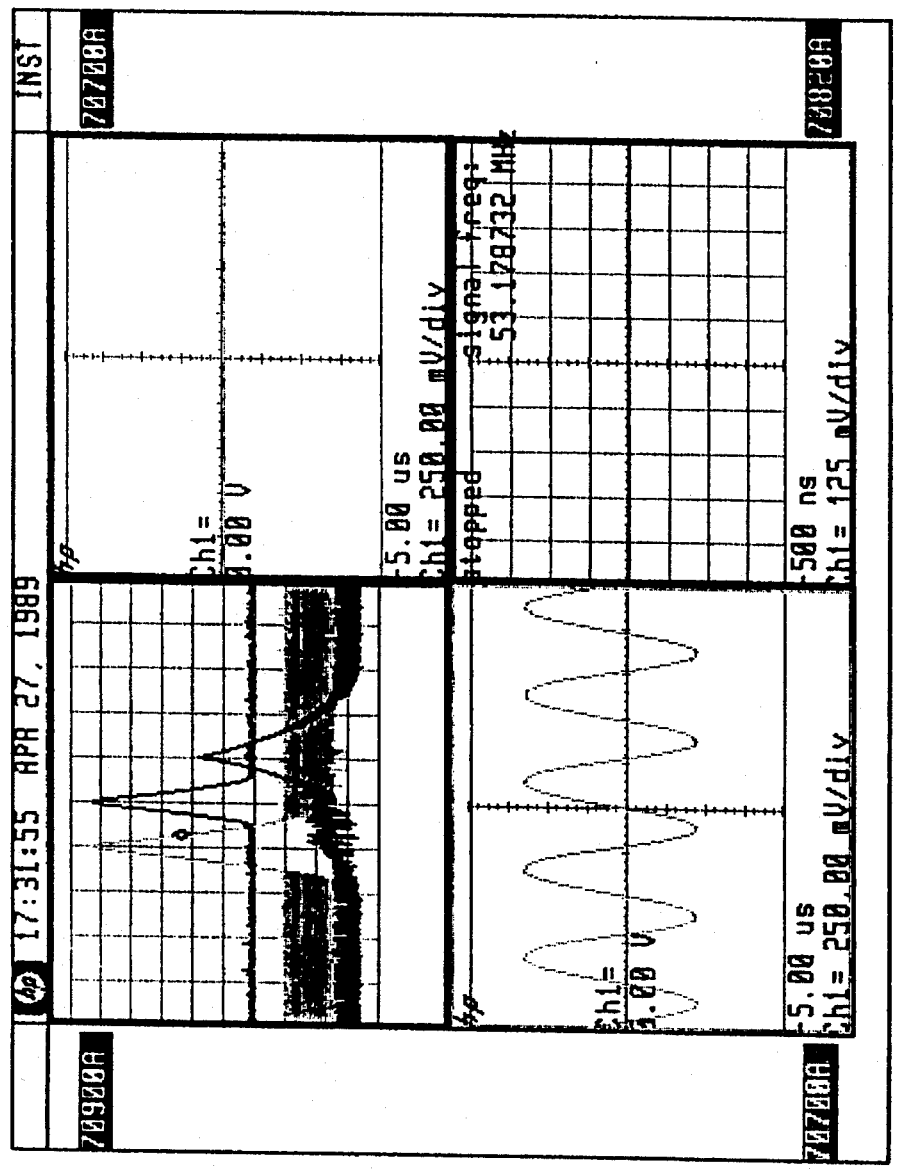

FIGS. 1–3 show example screens for one, two, and four window cases, respectively.

The listing of the firmware to implement the INSTR key follows:

"68000" PREPROCESS

```
($Log:   instr.P,v $
Revision 6.0.3.1  89/04/19  15:30:40  15:30:40  coryb (Cory Boyan)
MR release Revision 6.0  89/04/19  15:30:05  15:30:05  coryb (Cory Boyan)
Rev 6.0 to create
)

PROGRAM instr_P;

$EXTENSIONS ON$
#INCLUDE  define.H
(****************************************************************)

INCLUDE  text.H (****************************************************************)

DEFINE   FILE_NAME              instr_P
#INCLUDE  asm_dec.H
INCLUDE  pscl_dec.H $GLOBPROC ON$ (****************************************************************)
( This file handles the processing for the INSTR KEY functions. )
( It was added as of 7.0 and only pertains to the new hardware. )
(****************************************************************)

PROCEDURE COLOR_FRAME(Window: BYTE);                    (7.0)

( This procedure activates and colors the thick frame around a  )
( window (if it exists) and colors it Color.                    )

VAR Color:  SIGNED_16;

BEGIN
  CASE Window OF
    1: Color:= YELLOW;
    2: Color:= CYAN;
    3: Color:= PINK;
    4: Color:= TRD_COLOR;
    OTHERWISE Color:=0;
    END;
  SET_VLIST((Frame_pgm.Thickframes[Window-1].Area_pen),Color);
  SET_VLIST((Frame_pgm.Thickframes[Window-1].Area_fill1),AREA_FILL);
  SET_VLIST((Frame_pgm.Thickframes[Window-1].Area_fill2),AREA_FILL);
  SET_VLIST((Frame_pgm.Thickframes[Window-1].Area_fill3),AREA_FILL);
  SET_VLIST((Frame_pgm.Thickframes[Window-1].Area_fill4),AREA_FILL);
END;

(****************************************************************)

PROCEDURE SHOW_COLORS; (shows existing windows with colored frames)

VAR Point:      POINT_STACK;
    I:          BYTE;

BEGIN
```

7

```
  FOR I:=1 TO 4 DO
    BEGIN
    Point:=FIND_TASK(-1,I);
    IF (Point <> NIL) THEN COLOR_FRAME(I);
    END;
END;

(****************************************************************)
(                                                                )
( Usage of Update variables                                      )
(                                                                )
( Update_value1:              Task we are scanning for           )
( Update_value3:              Address of task (I/O)              )
( Update_value7:              character number to be loaded      )
(                                                                )
(****************************************************************)

PROCEDURE LOAD_INSTR_KEY(Task: SIGNED_16);
(setup the required menu key)

VAR  Key:     BYTE;
     Pen_loc: DATA_POINT;
     Color:   SIGNED_16;

BEGIN
CASE Task OF
  1 : BEGIN
      Key := 28;    (bottom left)
      Pen_loc.Value:=INTEGER(ADDR(SYSKEY1))+2;
      Color:= YELLOW;
      END;
  2 : BEGIN
      Key := 21;    (bottom right)
      Pen_loc.Value:=INTEGER(ADDR(SYSKEY8))+2;
      Color:= CYAN;
      END;
  3 : BEGIN
      Key := 22;    (top left)
      Pen_loc.Value:=INTEGER(ADDR(SYSKEY1))+2;
      Color:= PINK;
      END;
  4 : BEGIN
      Key := 15;    (top right)
      Pen_loc.Value:=INTEGER(ADDR(SYSKEY8))+2;
      Color:= TRD_COLOR;
      END;
  OTHERWISE Key:=0;
  END;
If (Key<>0) THEN
  BEGIN
  OPEN_KEY(Key,Instrkey_data);              ( "Open" the key. )
  Instrkey_data.Enhancement:=INVERSE;
  Pen_loc.Value:=Pen_loc.Value+KEY_OVER+KEY_PEN+
                  INTEGER(KEY_LENGTH*(SIGNED_16(Key-1) MOD 7));
  SET_VLIST(Pen_loc.Point_word^,Color);     ( Color the key  )
  END;
END; (LOAD_INSTR_KEY)

(****************************************************************)

PROCEDURE INSTR_SETUP;

( This procedure sets up the menu keys and begins the scanning  )
( of addresses for the INSTR KEY function.  It defines which    )
```

8

```
( routines handle NMAA and immediate data.                         )

VAR  Pointer:    POINT_STACK;
     Flag, Key:  BYTE;

BEGIN
   Flag:=DISABLE_MENU;                        ( Disable menus & RPG  )

FOR Key:=15 TO 28 DO                       ( Blank the softkeys   )
      BEGIN
      OPEN_KEY(Key,Instrkey_data);            ( "Open" the key.      )
      CLOSE_KEY(Instrkey_data);               ( "Close" the key.     )
      END;

Update_value1:=0;                          (find first task       )

REPEAT
      Update_value1:=Update_value1+1;
      Pointer:=FIND_TASK(-1,Update_value1);
      IF (Pointer<>NIL) THEN
         BEGIN
         Update_value3:=Pointer^.Channel;
         IF (Update_value3=UNUSED) THEN       (window unassigned as yet )
            Pointer:=NIL                      (get another task      )
         ELSE IF (Update_value3=HPIB) THEN    (treat HP-IB special   )
            BEGIN
            LOAD_INSTR_KEY(Update_value1);
            PRINT_STRING(Instrkey_data,' HP-IB ');
            Pointer:=NIL;                     (get another task      )
            END;
         END;
   UNTIL (Update_value1=4) OR (Pointer<>NIL);

IF (Pointer<>NIL) THEN
      BEGIN
      LOAD_INSTR_KEY(Update_value1);          (prepare approp. label )
      Nmaa_routine:=IMAP_TABLE[0];            ( Define execution     )
      Immed_routine:=IMAP_TABLE[1];           ( routines.            )
      Update_value7:=1;                       ( Process chars.       )
      SEND_COMMAND(Update_value3,MSIB_ID);    ( Start the riot.      )
      END
   ELSE
      BEGIN
      Nmaa_routine:=0;                        ( Terminate mode.      )
      Immed_routine:=0;
      END;

ENABLE_MENU(Flag);                         ( Restore menu & RPG   )
END;

(*************************************************************)

PROCEDURE INSTR_NMAA(Address: SIGNED_16);

( This procedure handles the case where a window exists with no module )

VAR Flag:      BYTE;
    Pointer:   POINT_STACK;

BEGIN
IF (Address = Update_value3) THEN             ( If from current addr )
   BEGIN Flag:=DISABLE_MENU;                        ( Disable keys & RPG   )
```

9

```
        Pointer:=NIL;

IF (Update_value1<4) THEN                      ( more tasks            )
          REPEAT
            Update_value1:=Update_value1+1;
            Pointer:=FIND_TASK(-1,Update_value1);
            IF (Pointer<>NIL) THEN
              BEGIN
                Update_value3:=Pointer^.Channel;
                IF (Update_value3=UNUSED) THEN         (window unassigned as yet )
                  Pointer:=NIL                         (get another task      )
                ELSE IF (Update_value3=HPIB) THEN      (treat HP-IB special   )
                  BEGIN
                    LOAD_INSTR_KEY(Update_value1);
                    PRINT_STRING(Instrkey_data,' HP-IB ');
                    Pointer:=NIL;                      (get another task      )
                  END;
              END;
          UNTIL (Update_value1=4) OR (Pointer<>NIL);

IF (Pointer<>NIL) THEN
          BEGIN
            LOAD_INSTR_KEY(Update_value1);             ( Prepare key label    )
            Update_value7:=1;                          ( Process chars.       )
            SEND_COMMAND(Update_value3,MSIB_ID);       ( Start the next riot. )
          END
        ELSE
          BEGIN
            Nmaa_routine:=0;                           ( Terminate mode.      )
            Immed_routine:=0;
          END;

ENABLE_MENU(Flag);                             ( Re-enable keys & RPG )
      END;
END;

(**************************************************************)

PROCEDURE INSTR_DATA(Address,Data: SIGNED_16);

( This routine processes data for the INSTR KEY function.       )

VAR Character:  WORD;
    Flag,I:     BYTE;

BEGIN
    IF (Address = Update_value3) THEN                  ( If from current addr.)
      IF (Data = END_DATA) THEN
        INSTR_NMAA(Address)                            ( End immediate: Finish)
      ELSE
        BEGIN
          BEGIN                                        ( Else display data.   )
          Flag:=DISABLE_MENU;                          ( Disable keys & RPG   )

Character.Word:=Data;
          IF (Update_value7<8) THEN                    ( If processing chars  )
            IF (Character.Low_byte=BYTE(",")) THEN     ( Comma is end of line.)
              BEGIN
                FOR I:=Update_value7 TO 7 DO
                  BEGIN
                    Instrkey_data.Character:=' ';
                    PRINT_CHAR(Instrkey_data);         ( Add to label         )
                  END;
                Update_value7:=8                       ( Process no more chars)
              END
```

10

```
        ELSE BEGIN
          Instrkey_data.Character:=CHR(Character.Low_byte);
          PRINT_CHAR(Instrkey_data);         { Add to label        }
          Update_value7:=Update_value7+1;
          END;

ENABLE_MENU(Flag);                   { Re-enable keys & RPG }
        END;
END;
{***************************************************************}
  .
```

The "Adjust Color" menu is used to modify the colors displayed by the HP 70004A display. The "Adjust Color" menu is:

RECALL COLORS
SAVE COLORS
edit colors
DEFAULT COLORS
MONOCHROME
special colors

RECALL COLORS and SAVE COLORS load and store the current color map from/to any of four color map registers. The user is prompted to enter a register number when one of these keys is depressed and concludes the entry with the "ENTER" softkey.

"DEFAULT COLORS" loads the current color map from a preset color map in read only memory (ROM). "MONOCHROME" loads the current color map with shades of green. The "special colors" menu loads predefined color maps out of ROM. The three choices are "VISION ENHNC1," "VISION ENHNC 2," and "OPTICAL FILTER," which are color maps optimized for two common visual impairments and for people working in red goggles often found in optics laboratories.

The "edit colors" menu allows editing of pens 0–11. This editing affects the current color map, regardless of how it was originally loaded. For example, the MONOCHROME palette can be loaded, and then one or more of the trace colors can be modified using "edit colors."

The "edit colors" menu labels look like:
BACK GROUND
COLOR 1
COLOR 2
COLOR 3
COLOR 4
COLOR 5
MORE 1 of 2
COLOR 6
COLOR 7
COLOR 8
COLOR 9
COLOR 10
KEY LABELS
MORE 2 of 2

Figure 4:
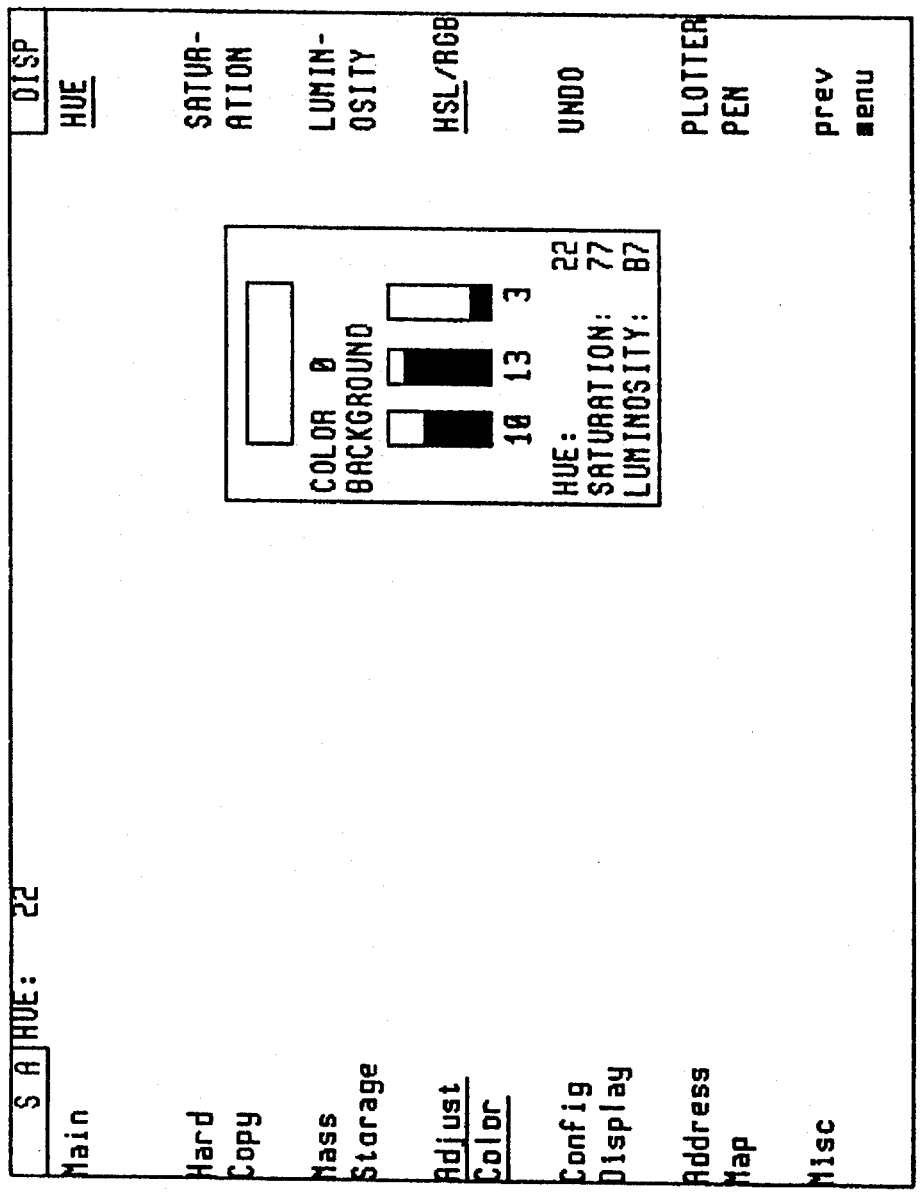
FIG. 4 shows an example for editing COLOR 0 in accordance with one embodiment of color adjustment method in accordance with the invention.

When any of these colors is selected, the following menu goes up:
HUE
SATURATION
LUMINOSITY
HSL/RGB
UNDO
PLOTTER PEN
prey menu An example, shown for editing COLOR 0, is shown in FIG. 4.

Figure 5:
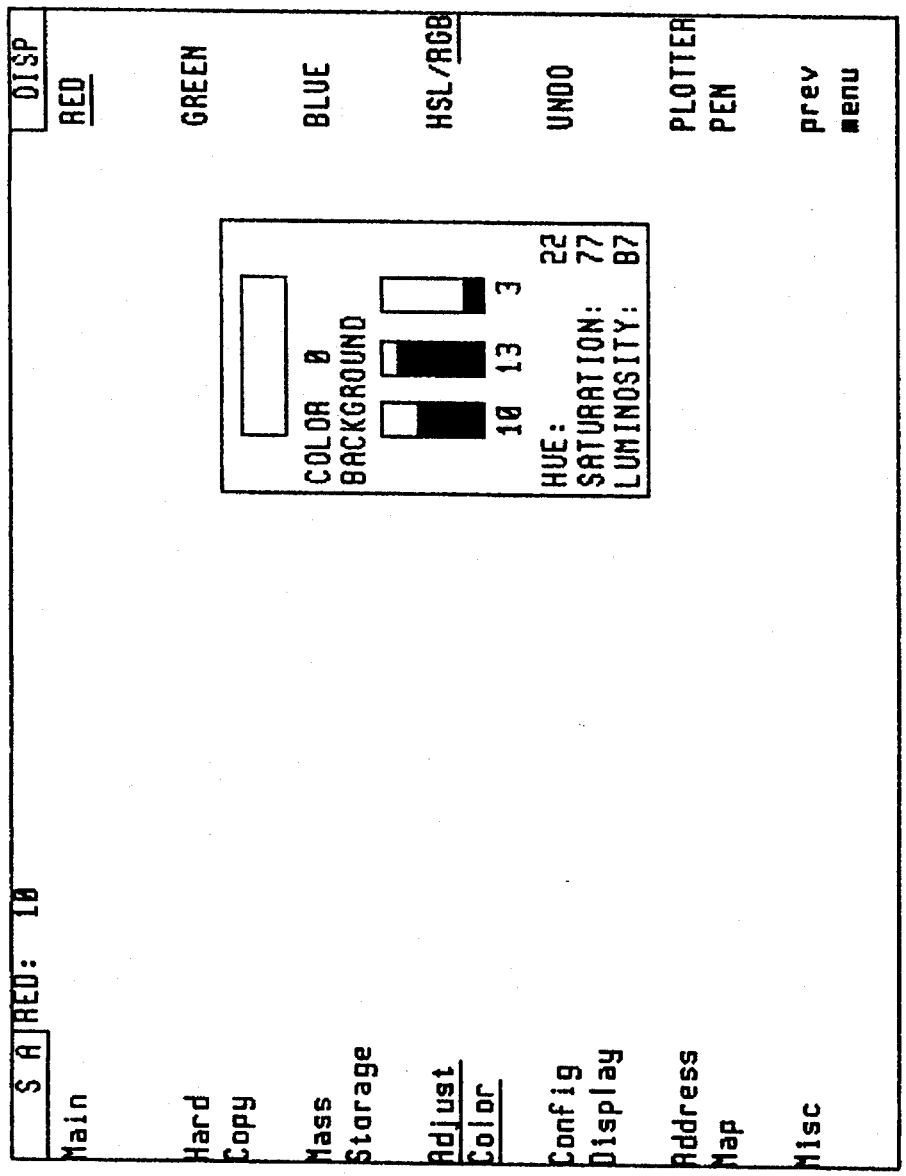
FIG. 5 shows an example of a softkey menu which indicates that RED is active and RGB selected in connection with adjusting the colors of a color display.

The active function (HUE, SATURATION, or LUMINOSITY) is underlined. HUE is active on entry to this menu. HSL is underlined as well. If the HSL/RGB key is depressed, the menu changes to:
RED
GREEN
BLUE
HSL/RGB
UNDO
PLOTTER PEN
prey menu with RED active and RGB underlined. An example is shown in FIG. 5.

In either case a box appears on the display screen which overrides a part of the on-screen data. In the box is a patch of the color being edited, and also red, green, and blue bars showing graphically the red, green, and blue content of the color. This is significant because the hardware implements the RGB model, and hence the bars show the exact hardware settings (and hence imply the parameters for the PC command) for that color. The values of HUE, SATURATION, LUMINOSITY, RED, GREEN, and BLUE are also displayed textually. One or more of these values changes when the rotary pulse generator knob is turned or a number entered.

Previous color editors allowed the user to adjust only the HSL values or the RGB values. The color editor in accordance with the invention allows adjustment of any of the six attributes of a color (RED value, GREEN value, BLUE value, HUE, SATURATION, or LUMINOSITY) and simultaneous display of all six attributes, along with a graphical readout of RGB. This allows the user to truly understand exactly how the color mix is being impacted by any changes being made to one of the six attributes.

The UNDO key restores the values for the current pen that existed when that pen was selected to edit. However, if the "prev menu" key is depressed (thus returning to the menu with the pen selections), the newly edited values are "latched" into that pen.

The algorithm for converting RED/GREEN/BlUE (RGB) colors to/from HUE/SATURATION/LUMINOSITY (HSL) colors is shown in the respective RGB TO HSL and HSL TO RGB routines in the listing that follows.

14

```
"68000" PREPROCESS ($Log:  color.P,v $
Revision 6.0.3.1  89/04/19  15:30:37  15:30:37  coryb (Cory Boyan)
MR release Revision 6.0  89/04/19  15:29:40  15:29:40  coryb (Cory Boyan)
Rev 6.0 to create
)

PROGRAM color_P;

$EXTENSIONS ON$
#INCLUDE   define.H
(****************************************************************)

#INCLUDE   text.H

COLED_PATCH,COLED_RED,COLED_GREEN,COLED_BLUE,COLED_NUMBER,
COLED_NAME,COLED_REDT,COLED_GREENT,COLED_BLUET,COLED_HUET,
COLED_SATT,COLED_LUMT,COLED_PROGRAM  :   SIGNED_16;

HUE_MSG:       LONG_LANGUAGE;

(****************************************************************)

$GLOBVAR ON$

VAR
Old_red, Old_green, Old_blue : SIGNED_16;

#DEFINE   FILE_NAME             color_P
#INCLUDE  asm_dec.H
INCLUDE  pscl_dec.H $GLOBPROC ON$ ( ****************** NOTES ON H S & L **************************)
( Hue changes only 1 color between max & min determined by Saturation )
(  and Luminosity while others stay at levels determined by S & L.    )
( Luminosity determines the max any color can get; if Luminosity is   )
(  100%, at least one color is at max.                                )
( Saturation determines the minimum any color can get; if Saturation is )
(  100%, there is no white, which means at least one color is off.    )
( Hence a common scenario is to adjust hue with Sat and Lum both 100%, )
(  in which case one color is at 0, one is full on, and the other goes )
(  from 0 to 100 as hue changes; when it gets to 100, the color already )
(  at 100 starts toward 0, and so on.  Only one changes at a time while )
(  one of the others is full on and the other is full off.            )

(****************************************************************)
(                                                                )
( Usage of Update variables                                      )
(                                                                )
( Update_point1:                                                 )
( Update_point2:                                                 )
( Update_point3:                                                 )
( Update_point4:                                                 )
( Update_point5:                                                 )
```

```
                              - 15

( Update_point6:                                                 )
(                                                                )
( Update_value1:          Pen being edited                       )
( Update_value2:          Prev value storage                     )
( Update_value3:          Red                                    )
( Update_value4:          Green                                  )
( Update_value5:          Blue                                   )
( Update_value6:          Hue                                    )
( Update_value7:          Saturation                             )
( Update_value8:          Luminosity                             )
(                                                                )
(*****************************************************************)

( The USER_PALETTE is a 0..15 array of SIGNED_16, each entry
  of which contains:

------------------------------
           | Attr | Red | Green | Blue |
           ------------------------------
              4     4      4      4

Red, Green, and Blue go between 0 and 15.
  Hue, Saturation and Luminosity go between 0 and 100.          )

(*****************************************************************)

PROCEDURE HSL_TO_RGB;   (derives the RGB values from the HSL)

VAR Sextant, Low_color, High_color, Frac, Q, T : SIGNED_16;

BEGIN
  IF (Update_value7 = 0) THEN    ( ignore Hue, no saturation )
    BEGIN                        ( set colors = Luminosity   )
    (add 50 to round)
    Update_value3:=((15*Update_value8)+50)/100;   (red)
    Update_value4:=Update_value3;                 (green)
    Update_value5:=Update_value3;                 (blue)
    END
  ELSE BEGIN
    IF Update_value6>50 THEN Sextant:=(Update_value6+1)/17
      ELSE Sextant:=(Update_value6)/17;   (determine sextant from Hue:
                                           0-16  0    50-66  3
                                           17-33 1    67-83  4
                                           34-49 2    84-99  5      )

Frac:=(Update_value6*6)-(Sextant*100); (Frac = how far into sextant
                                            Hue is, *100. Eg, if it is
                                            halfway in, Frac = 50.  )

(The color (R,G,or B) at the lowest level is the product of Luminosity
     and 1-Saturation.  Normally these values go from 0-1, but here they
     go 0-100.  Hence the result is x 10000.  But since the result
     normally goes 0-1 but in our case goes 0-15, it is really only x
     10000/15 = 666.67.  We add 333 to effect rounding:              )

Low_color:=((Update_value8*(100-Update_value7))+333)/667;

(The color at the highest level is the same as Luminosity:)

High_color:=((15*Update_value8)+50)/100;   (add 50 to round)

( Q and T, normally values between 0 and 1, are determined by the
      following formulae:
                    Q=Luminosity*(1-(Saturation*frac))
```

16

```
                T=Luminosity*(1-(Saturation*(1-Frac)))
    Because of the complexity of these formulae only the desired
    one is executed for any given color:

Q:=(Update_value8*((10000-(Update_value7*Frac))/100))/667;
    T:=(Update_value8*((10000-(Update_value7*(100-Frac)))/100))/667; )

( The descriptions below apply for the fully saturated 100% Luminosity case: )

CASE Sextant OF
     0: BEGIN   ( Full red, increasing green, no blue )
    (R) Update_value3:=High_color;
    (G) Update_value4:=((Update_value8*((10000-(Update_value7*(100-Frac)))/100))+333)/667; (T)
    (B) Update_value5:=Low_color;
        END;
     1: BEGIN   ( Full green, decreasing red, no blue )
    (R) Update_value3:=((Update_value8*((10000-(Update_value7*Frac))/100))+333)/667; (Q)
    (G) Update_value4:=High_color;
    (B) Update_value5:=Low_color;
        END;
     2: BEGIN   ( Full green, increasing blue, no red )
    (R) Update_value3:=Low_color;
    (G) Update_value4:=High_color;
    (B) Update_value5:=((Update_value8*((10000-(Update_value7*(100-Frac)))/100))+333)/667; (T)
        END;
     3: BEGIN   ( Full blue, decreasing green, no red )
    (R) Update_value3:=Low_color;
    (G) Update_value4:=((Update_value8*((10000-(Update_value7*Frac))/100))+333)/667; (Q)
    (B) Update_value5:=High_color;
        END;
     4: BEGIN   ( Full blue, increasing red, no green )
    (R) Update_value3:=((Update_value8*((10000-(Update_value7*(100-Frac)))/100))+333)/667; (T)
    (G) Update_value4:=Low_color;
    (B) Update_value5:=High_color;
        END;
     5: BEGIN   ( Full red, decreasing blue, no green )
    (R) Update_value3:=High_color;
    (G) Update_value4:=Low_color;
    (B) Update_value5:=((Update_value8*((10000-(Update_value7*Frac))/100))+333)/667; (Q)
        END;
     OTHERWISE;
     END; (CASE)
   END;  (IF (Update_value7 = 0))
 END;

{************************************************************}

PROCEDURE RGB_TO_HSL;   (derives the HSL values from the RGB)

VAR Max, Min, Diff : SIGNED_16;

BEGIN
  IF (Update_value3>=Update_value4) AND (Update_value3>=Update_value5)
    THEN Max:=Update_value3      (red)
  ELSE IF (Update_value4>=Update_value5) AND (Update_value4>=Update_value3)
    THEN Max:=Update_value4      (green)
  ELSE IF (Update_value5>=Update_value4) AND (Update_value5>=Update_value3)
    THEN Max:=Update_value5;     (blue)

IF (Update_value3<=Update_value4) AND (Update_value3<=Update_value5)
    THEN Min:=Update_value3      (red)
  ELSE IF (Update_value4<=Update_value5) AND (Update_value4<=Update_value3)
    THEN Min:=Update_value4      (green)
  ELSE IF (Update_value5<=Update_value4) AND (Update_value5<=Update_value3)
```

```
    THEN Min:=Update_value5;      (blue)

Diff:=Max-Min;                        ( Difference will be used later           )
  Update_value8:=((100*Max)+7)/15;  ( Luminosity is equal to the brightest color.)
                                    ( (7 is added to round.)                     )
  IF (Max<>0) THEN                  ( Saturation is the difference over the max  )
    Update_value7:=((100*Diff)+(Max/2))/Max   ( Max/2 added to round.            )
  ELSE
    Update_value7:=0;

IF (Update_value7<>0) THEN    ( Don't change Hue if Saturation is 0 )
    BEGIN                       ( 3 is added to round.                )
    IF Update_value3=Max THEN         ( Max RED    )
      Update_value6:=((((Update_value4-Update_value5)*100)/Diff)+3)/6
    ELSE IF Update_value4=Max THEN    ( Max GREEN )
      Update_value6:=((200+((Update_value5-Update_value3)*100)/Diff)+3)/6
    ELSE IF Update_value5=Max THEN    ( Max BLUE  )
      Update_value6:=((400+((Update_value3-Update_value4)*100)/Diff)+3)/6;
    IF Update_value6<0 THEN Update_value6:=100+Update_value6;
    IF Update_value6>99 THEN Update_value6:=100-Update_value6;
    END;
END;

(************************************************************)

PROCEDURE UPDATE_READOUT(Value,Digits: SIGNED_16; Where: POINT_WORD);
  VAR   I:       SIGNED_16;
        Temp:    STRING;
        Point:   POINT_WORD;
  BEGIN
  CONVERT_TO_TEN(Temp,Value,Digits);
  Point:=Where;
  FOR I:=1 TO Digits DO
    BEGIN
    SET_VLIST(Point^,SIGNED_16(UNSIGNED_8(Temp[I])));
    Point:=POINT_WORD(INTEGER(Point)+2);
    END;
  END;

(************************************************************)

PROCEDURE UPDATE_COLED;
  BEGIN
  SET_VLIST(COLED_RED,Update_value3*3);
  SET_VLIST(COLED_GREEN,Update_value4*3);
  SET_VLIST(COLED_BLUE,Update_value5*3);
  UPDATE_READOUT(Update_value3,3,ADDR(COLED_REDT));
  UPDATE_READOUT(Update_value4,3,ADDR(COLED_GREENT));
  UPDATE_READOUT(Update_value5,3,ADDR(COLED_BLUET));
  UPDATE_READOUT(Update_value6,4,ADDR(COLED_HUET));
  UPDATE_READOUT(Update_value7,4,ADDR(COLED_SATT));
  UPDATE_READOUT(Update_value8,4,ADDR(COLED_LUMT));
  USER_PALETTE[Update_value1]:=256*Update_value3  {red}
                              +16*Update_value4   {green}
                                 +Update_value5;  {blue}
  New_checks:=CHECKSUM(ADDR(USER_PALETTE),NEW_SIZE);
  SET_PALETTE(ADDR(USER_PALETTE));
  END;

(************************************************************)

PROCEDURE OLD_ONES;    (restores old colors)
  BEGIN
  Update_value3:=Old_red;
```

18

```
  Update_value4:=Old_green;
  Update_value5:=Old_blue;
  Update_value6:=0;   (Initialize Hue to 0 in case Saturation is 0)
  RGB_TO_HSL;         (Derive H,S,L)
  UPDATE_COLED;
  POKE_KEY(SOFTKEY+1);              (push RED or HUE        )
  END;

(****************************************************************)

PROCEDURE LOAD_MONO;
  BEGIN
  IF GET_VLIST(Update_pgm)=BS_COLED_FLAG THEN
      SET_VLIST(Update_pgm,RETURN);         ( Disable the pgm )
  USER_PALETTE:=MONO_PALETTE;
  New_checks:=CHECKSUM(ADDR(USER_PALETTE),NEW_SIZE);
  SET_PALETTE(ADDR(USER_PALETTE));
  END;

(****************************************************************)

PROCEDURE LOAD_DEFCOLOR;
  BEGIN
  IF GET_VLIST(Update_pgm)=BS_COLED_FLAG THEN
      SET_VLIST(Update_pgm,RETURN);         ( Disable the pgm )
  USER_PALETTE:=DEFAULT_PALETTE;
  New_checks:=CHECKSUM(ADDR(USER_PALETTE),NEW_SIZE);
  SET_PALETTE(ADDR(USER_PALETTE));
  END;

(****************************************************************)

PROCEDURE COLED_SETUP;

VAR Pointer,Temp:              DATA_POINT;

BEGIN
   (Fetch R,G,B)

Update_value3:=SIGNED_16(BINARY_WORD(SHIFT(USER_PALETTE[Update_value1],-8))
                       *BINARY_WORD(0F00H));
   Update_value4:=SIGNED_16(BINARY_WORD(SHIFT(USER_PALETTE[Update_value1],-4))
                       *BINARY_WORD(0F00H));
   Update_value5:=SIGNED_16(BINARY_WORD(USER_PALETTE[Update_value1])
                       *BINARY_WORD(0F00H));

Old_red:=Update_value3;   (save old colors for UNDO)
   Old_green:=Update_value4;
   Old_blue:=Update_value5;

Update_value6:=0;   (Initialize Hue to 0 in case Saturation is 0)
   RGB_TO_HSL;         (Derive H,S,L)

Pointer:=ROUTINE_BS(DATA_POINT(ADDR(COLED_PROGRAM)),  (load color editor)
                   DATA_POINT(ADDR(Update_pgm)));       (dot gen pgm    )

SET_VLIST(COLED_PATCH,Update_value1);   (Set patch color )
   UPDATE_READOUT(Update_value1,3,ADDR(COLED_NUMBER));

UPDATE_COLED;                               ( set up initial values )
   SET_VLIST(Update_pgm,BS_COLED_FLAG);        ( Enable the pgm )

END;
```

19

```
(****************************************************************)

PROCEDURE COLOR_EDITOR;

{ This procedure is called via the DISPLAY menu. It              }
{ starts the process of editing the selected color.              }

VAR Flag:      BYTE;

BEGIN
   Flag:=DISABLE_MENU;                     { Disable menu during }
                                           { processing          }
   COLED_SETUP;                            { Build the B.S. progm.}

POKE_KEY(SOFTKEY+1);                    { Enable HUE adjust   }

ENABLE_MENU(Flag);                      { Re-enable menus     }
END;

(****************************************************************)

PROCEDURE ADJ_COLOR0;
BEGIN
  Update_value1:=0;
  COLOR_EDITOR;
END;

PROCEDURE ADJ_COLOR1;
BEGIN
  Update_value1:=1;
  COLOR_EDITOR;
END;

PROCEDURE ADJ_COLOR2;
BEGIN
  Update_value1:=2;
  COLOR_EDITOR;
END;

PROCEDURE ADJ_COLOR3;
BEGIN
  Update_value1:=3;
  COLOR_EDITOR;
END;

PROCEDURE ADJ_COLOR4;
BEGIN
  Update_value1:=4;
  COLOR_EDITOR;
END;

PROCEDURE ADJ_COLOR5;
BEGIN
  Update_value1:=5;
  COLOR_EDITOR;
END;

PROCEDURE ADJ_COLOR6;
BEGIN
  Update_value1:=6;
  COLOR_EDITOR;
END;

PROCEDURE ADJ_COLOR7;
```

20

```
BEGIN
  Update_value1:=7;
  COLOR_EDITOR;
END;

PROCEDURE ADJ_COLOR8;
BEGIN
  Update_value1:=8;
  COLOR_EDITOR;
END;

PROCEDURE ADJ_COLOR9;
BEGIN
  Update_value1:=9;
  COLOR_EDITOR;
END;

PROCEDURE ADJ_COLOR10;
BEGIN
  Update_value1:=10;
  COLOR_EDITOR;
END;

PROCEDURE ADJ_COLOR11;
BEGIN
  Update_value1:=11;
  COLOR_EDITOR;
END;

{*****************************************************************}

PROCEDURE RED_ADJUST;

BEGIN
   Update_value2:=Update_value3;              { save old            }
   CASE Knob_mode OF                          { Adjust variable     }

KNOB_SET:
         Update_value3:=Knob_variable;

KNOB_UPDATE:
         BEGIN
         IF (Intr_count<0) THEN
            Update_value3:=Update_value3-1;
         IF (Intr_count>0) THEN
            Update_value3:=Update_value3+1;
         END;

OTHERWISE;
      END; {CASE}

IF Update_value3<0 THEN Update_value3:=0;
   IF Update_value3>15 THEN Update_value3:=15;

Intr_count:=0;

IF Update_value3<>Update_value2 THEN       { act on change }
      BEGIN
      RGB_TO_HSL;         { Derive HSL values from RGB values }
      UPDATE_COLED;       { Update color editor screen        }
      END;

Knob_variable:=SIGNED_16(Update_value3);    { Put Update_value3 in }
                                               { variable for cmd.    }
```

```
                                                { line use.          }
END;

{****************************************************************}

PROCEDURE GREEN_ADJUST;

BEGIN
   Update_value2:=Update_value4;                { save old           }
   CASE Knob_mode OF                            { Adjust variable    }

KNOB_SET:
         Update_value4:=Knob_variable;

KNOB_UPDATE:
         BEGIN
         IF (Intr_count<0) THEN
            Update_value4:=Update_value4-1;
         IF (Intr_count>0) THEN
            Update_value4:=Update_value4+1;
         END;

OTHERWISE;
      END; {CASE}

IF Update_value4<0 THEN Update_value4:=0;
   IF Update_value4>15 THEN Update_value4:=15;

Intr_count:=0;

IF Update_value4<>Update_value2 THEN         { act on change }
      BEGIN
      RGB_TO_HSL;          { Derive HSL values from RGB values }
      UPDATE_COLED;        { Update color editor screen        }
      END;

Knob_variable:=SIGNED_16(Update_value4);     { Put Update_value4 in }
                                                { variable for cmd.    }
                                                { line use.            }
END;

{****************************************************************}

PROCEDURE BLUE_ADJUST;

BEGIN
   Update_value2:=Update_value5;                { save old           }
   CASE Knob_mode OF                            { Adjust variable    }

KNOB_SET:
         Update_value5:=Knob_variable;

KNOB_UPDATE:
         BEGIN
         IF (Intr_count<0) THEN
            Update_value5:=Update_value5-1;
         IF (Intr_count>0) THEN
            Update_value5:=Update_value5+1;
         END;

OTHERWISE;
      END; {CASE}

IF Update_value5<0 THEN Update_value5:=0;
```

```
    IF Update_value5>15 THEN Update_value5:=15;

Intr_count:=0;

IF Update_value5<>Update_value2 THEN        ( act on change )
      BEGIN
        RGB_TO_HSL;         ( Derive HSL values from RGB values )
        UPDATE_COLED;       ( Update color editor screen        )
      END;

Knob_variable:=SIGNED_16(Update_value5);    ( Put Update_value5 in )
                                                ( variable for cmd.    )
                                                ( line use.            )
END;

{***************************************************************}

PROCEDURE HUE_ADJUST;

BEGIN
  IF (Update_value7=0) THEN
    BEGIN
    PRINT_STRING(Private_line,HUE_MSG[Language]^);
    Current_digits:=0;    (disable SHOW_ENTRY)
    END ELSE BEGIN
    Update_value2:=Update_value6;               ( save old         )
    CASE Knob_mode OF                           ( Adjust variable  )

KNOB_SET:
            Update_value6:=Knob_variable;

KNOB_UPDATE:
           BEGIN
           IF (Intr_count<0) THEN
              Update_value6:=Update_value6-1;
           IF (Intr_count>0) THEN
              Update_value6:=Update_value6+1;
           END;

OTHERWISE;
        END; (CASE)

(HUE wraps around:)
    IF Update_value6<0 THEN Update_value6:=100+Update_value6;
    IF Update_value6>99 THEN Update_value6:=100-Update_value6;

Intr_count:=0;

IF Update_value6<>Update_value2 THEN        ( act on change )
      BEGIN
        HSL_TO_RGB;         ( Derive RGB values from HSL values )
        UPDATE_COLED;       ( Update color editor screen        )
      END;

Knob_variable:=SIGNED_16(Update_value6);    ( Put Update_value6 in )
                                                ( variable for cmd.    )
                                                ( line use.            )
    END;
END;

{***************************************************************}
```

23

```
PROCEDURE SAT_ADJUST;

BEGIN
   Update_value2:=Update_value7;                    ( save old              )
   CASE Knob_mode OF                                ( Adjust variable       )

KNOB_SET:
         Update_value7:=Knob_variable;

KNOB_UPDATE:
         BEGIN
         IF (Intr_count<0) THEN
            Update_value7:=Update_value7-1;
         IF (Intr_count>0) THEN
            Update_value7:=Update_value7+1;
         END;

OTHERWISE;
      END; (CASE)

IF Update_value7<0 THEN Update_value7:=0;
   IF Update_value7>100 THEN Update_value7:=100;

Intr_count:=0;

IF Update_value7<>Update_value2 THEN         ( act on change )
      BEGIN
      HSL_TO_RGB;          ( Derive RGB values from HSL values )
      UPDATE_COLED;        ( Update color editor screen        )
      END;

Knob_variable:=SIGNED_16(Update_value7);     ( Put Update_value7 in )
                                                ( variable for cmd.    )
                                                ( line use.            )
END;

{***************************************************************}

PROCEDURE LUM_ADJUST;

BEGIN
   Update_value2:=Update_value8;                    ( save old              )
   CASE Knob_mode OF                                ( Adjust variable       )

KNOB_SET:
         Update_value8:=Knob_variable;

KNOB_UPDATE:
         BEGIN
         IF (Intr_count<0) THEN
            Update_value8:=Update_value8-1;
         IF (Intr_count>0) THEN
            Update_value8:=Update_value8+1;
         END;

OTHERWISE;
      END; (CASE)

IF Update_value8<0 THEN Update_value8:=0;
   IF Update_value8>100 THEN Update_value8:=100;

Intr_count:=0;

IF Update_value8<>Update_value2 THEN         ( act on change )
```

24

```
    BEGIN
    HSL_TO_RGB;          ( Derive RGB values from HSL values )
    UPDATE_COLED;        ( Update color editor screen        )
    END;

Knob_variable:=SIGNED_16(Update_value8);    ( Put Update_value8 in )
                                             ( variable for cmd.    )
                                             ( line use.            )
END;

(****************************************************************)

PROCEDURE PEN_COLOR;

( PC Pen,Red,Green,Blue                                          )
(                                                                )
( This routine implements the HPGL 'PC' command. All the parms   )
( are optional and default to 1,existing,existing,existing.      )
(                                                                )
( PC -1 causes the USER_PALETTE to get loaded into the task's    )
( Color_map palette.                                             )
(                                                                )
( The actual color map hardware is only output to if the task    )
( sending PC has a keyboard or control link.                     )

VAR Lred,Lgreen,Lblue,Lpen: SIGNED_16;

BEGIN
WITH Task_point^ DO
  BEGIN
     Lpen :=DEFAULT_WORD(1,GET_PARM_WORD);

IF (Lpen = -1) THEN {restore user's palette}
       Color_map := USER_PALETTE

ELSE BEGIN

Lred  :=SIGNED_16(BINARY_WORD(SHIFT(Color_map[Lpen],-8))*BITS_0to3);
       Lgreen:=SIGNED_16(BINARY_WORD(SHIFT(Color_map[Lpen],-4))*BITS_0to3);
       Lblue :=SIGNED_16(BINARY_WORD(Color_map[Lpen])*BITS_0to3);

IF (TERMINATOR(Task_point^.Input_term) <> True) THEN
          BEGIN
          Lred :=DEFAULT_WORD(Lred,SHIFT(GET_PARM_WORD,-4));
          IF (TERMINATOR(Task_point^.Input_term) <>True) THEN
             BEGIN
             Lgreen  :=DEFAULT_WORD(Lgreen,SHIFT(GET_PARM_WORD,-4));
             IF (TERMINATOR(Task_point^.Input_term) <>True) THEN
                Lblue  :=DEFAULT_WORD(Lblue,SHIFT(GET_PARM_WORD,-4));
          END; (IF)
       END; (IF)

Color_map[Lpen]:= 256*Lred+16*Lgreen+Lblue;
       END; (IF Lpen = -1)

{If this task has a keyboard or control link then}
     SET_PALETTE(ADDR(Color_map)); {send new values to GSP (NOP if old hardware) }
     {also do whenever keyboard or control link established}
     {and reset hardware to USER if task w/ keyboard is purged}
     {in fact modify USER_PALETTE also if control link         }

EOL_CHECK;
  END;

END;
```

The graphics hardware in the HP 70004A display comprises a 12.5 MHz Motorola 68000 microprocessor which handles all I/O, graphics scaling, and stroke generation functions, and a 50 MHz TMS34010 Graphics System Processor (GSP) which handles the raster conversion of vector information into colored dots on the screen.

The two processors run asynchronously, with the GSP constantly parsing the vector list and writing dots into the bit map. To avoid any artifacts produced by viewing data on the screen while the GSP is updating it, two separate bit maps are used, one of which is viewed while the other is drawn. They are swapped each time the GSP finishes one complete scan of the vector list.

The resolution is 1024×400 dots. This is unique in that graphics systems have aspect ratios near 4×3; here we have an aspect ratio near 8×3. Therefore, this system has effectively double the typical horizontal resolution. This allows dot positioning to twice as fine a degree as is typical, which allows the display of twice as many points of data on the horizontal axis with no loss of resolution. However, given the approximately 147×105 mm display area, each pixel is essentially 0.14 mm wide ×0.26 mm high, or approximately twice as high as wide. It is desirable for pixels to be square, as this provides for smoother vertical transitions, and equalizes the brightness of vertical and horizontal lines. Therefore, all dots are stretched to be two pixels wide. FIG. 6 shows how this helps make traces overlap and thus smooths the transitions.

Dot or pixel stretching in accordance with the invention is implemented by drawing every line twice. The second time that the line is drawn, the start and the end points are moved one pixel to the right. This works regardless of the orientation of the line.

A listing of the line drawing routine, showing dot stretching, appears below. The language is Texas Instruments TMS34010 assembly language.

```
draw_line:
        move    CURXY,DADDR                         ; starting point of line
        move    NEWXY,SADDR                         ; ending point of line
        clr     DYDX                                ; [0,0]
        subxy   DADDR,SADDR                         ; SADDR = [b,a] = end-start
        jrz     horiz                               ; IF DeltaY == 0, Horizontal
        jrn     vert                                ; IF DeltaX == 0, Vertical
        subb    INC1,INC1                           ; fast way to set all bits = to
                                                    ; carry from above. INC1 now
                                                    ; = [-1,-1] if b<0 or [0,0] if b>=0
                                                    ; Will be used later.
        movk    1,COUNT                             ; assume a<0 and b<0, fix later if not
        subxy   SADDR,DYDX                          ; [-b,-a]
        jrnc    line1                               ; branch if -b<0
        movy    SADDR,DYDX                          ; -b>=0, DYDX=[b,-a]
        not     INC1                                ; [-1,-1]
        srl     15,INC1                             ; [+1,-1]
line1:                                              ; DYDX MSW is now positive, INC1 MSW set
        jrnv    line2                               ; branch if -a<0
        movx    SADDR,DYDX                          ; -a>=0, DYDX=[b,a]
        movx    COUNT,INC1                          ; [+1,+1]
line2:                                              ; INC1 & DYDX now set, DYDX MSW & LSW pos
        clr     INC2                                ; [0,0]
        move    DYDX,SADDR                          ; [b',a'] (b' & a' are absolute values)
        srl     16,SADDR                            ; [0,b']
        cmpxy   SADDR,DYDX                          ; compare a and b
        jrv     line3                               ; branch if a' < b'
        movx    INC1,INC2                           ; b' >= a', INC2=[0,INC1(X)]
        jruc    line4                               ; b' >= a', no swap required
line3:                                              ; a' < b', swap a' and b'
        movx    DYDX,SADDR                          ; [0,b"]b"=a'
        rl      16,DYDX                             ; [b",a"], b"=a', a"=b', b" >= a"
        movy    INC1,INC2                           ; INC2=[INC1(Y),0]
line4:                                              ; a and b now both positive and b >= a
        add     SADDR,SADDR                         ; 2 * b
        movx    DYDX,COUNT                          ; a
        sub     COUNT,SADDR                         ; d=2 * b - a
        addk    1,COUNT                             ; a + 1
        MMTM    SP,SADDR,DADDR,COUNT,PATTRN         ; save evrything
        LINE    0                                   ; draw line
        MMFM    SP,SADDR,DADDR,COUNT,PATTRN         ; recall everything
        ADDI    [1,0],DADDR                         ; move vertices right one
        LINE    0                                   ; draw line again to implement
        jruc    done                                ; DOT STRETCHING.
horiz:
        jrn     gpixel
        jrnv    do_fill
        subxy   SADDR,DYDX                          ; make DeltaX positive : DYDX = 0-[b,a]
        move    DYDX,SADDR
        subxy   SADDR,DADDR                         ; change start to (y1,x1)
        jruc    do_fill
vert:
        jrnc    do_fill
        neg     SADDR                               ; make DeltaY positive
        subxy   SADDR,DADDR                         ; change start to (y1,x1)
do_fill:
        move    SADDR,DYDX
```

```
                addi        020001H,DYDX              ; add 1 to each dimension so line covers all dots
                                                      ; and is a dot thick; add 1 more to x so 2 dots thick
                fill        XY                        ; thus implementing DOT STRETCHING
                jruc        done
gpixel:
                movi        [1,0],INC2                ; just a dot
                DRAV        INC2,DADDR                ; draw dot
                DRAV        INC2,DADDR                ; draw again to implement DOT STRETCHING
done:
                RETS
*       END DRAW LINE ROUTINE
```

The foregoing description is offered primarily for purposes of illustration. While a variety of embodiments has been disclosed, it will be readily apparent to those skilled in the art that numerous other modifications and variations not mentioned above can still be made without departing from the spirit and scope of the invention as claimed below.

What is claimed is:

1. A method for user interaction with a display for an electronic system, the display comprising a screen that displays a plurality of windows, the system comprising a plurality of instruments wherein instrument states for each of at least two of the plurality of instruments are displayed in respective windows simultaneously, the method comprising the steps of:

providing an instrument key to initiate a sequence to access at least one of the instruments, whose instrument state is being displayed in one of the plurality of windows, to change instrument settings, the instrument key to facilitate a change in settings of any instrument displayed in any of the windows that appears on the screen, the instrument key being depressed by a user for initiating a sequence for selecting the instrument whose settings are to be changed;

responding to user depression of the instrument key by displaying a first softkey menu having a plurality of user selections corresponding to the instruments whose instrument states appear in the windows displayed on the screen;

responding to user depression of a softkey that appears in the first softkey menu by displaying a second softkey menu having a plurality of user selections corresponding to available settings of the selected instrument; and responding to user depression of a softkey that appears in the second softkey menu by enabling means for adjusting a selected setting of the selected instrument;

thereby providing two-stroke access to an instrument displayed in any window displayed on-screen, thus greatly easing the burden of controlling instruments whose instrument states appear in the plurality of windows.

2. The method of claim 1 wherein the display is a color display and different colors are used to indicate correspondence between the instruments displayed in the windows and instrument selections on the first softkey menu.

3. The method of claim 2 wherein each instrument is provided with a label identification and a softkey containing at least a portion of the label identification for the instrument is displayed in inverse video in the same color as the associated window border.

4. The method of claim 3 wherein the label identifications are model numbers, multiple instruments having the same model number are used, and the row and column addresses of the instruments having the same model number are displayed in the first softkey menu to distinguish between instruments having the same model number.

5. The method of claim 1 wherein label identifications of the instruments displayed in the windows appear in the first softkey menu.

6. The method of claim 5 wherein multiple instruments having the same model number are used, and the row and column addresses of the instruments having the same model number are displayed to distinguish between instruments having the same model number.

7. The method of claim 1 wherein each of the plurality of instruments comprises one of a module and a combination of modules.

8. A method for adjusting a plurality of colors associated with a plurality of images displayed on a screen of a color display system, comprising the steps of:

providing a user with a softkey menu for color adjustment, which enables the user to adjust each of six attributes of a color, the attributes comprising red value, green value, blue value, hue, saturation, and luminosity, wherein the attributes red value, green value, and blue value belong to one color system and the attributes hue, saturation, and luminosity belong to another color system;

simultaneously displaying each of the six attributes;

responding to user depression of a softkey that appears in the color adjustment softkey menu for enabling means for adjusting the selected attribute of the color; and displaying a user adjustment of the selected color attribute as a corresponding change in the attributes of the other color system;

thereby enabling the user to select any desired color.

9. The method of claim 8, further comprising the step of providing a color editor resident in the display and a superimposed window on the screen, and wherein the window displays red value, green value, and blue value as at least one of a) numeric readouts and b) bars in a bar graph format which change in height, as the user changes the red, green, and blue values.

10. The method of claim 9 wherein the window further displays readouts for hue, saturation, and luminosity, which change as the user adjusts values thereby providing a simultaneous display of all six attributes to enable the user to view how the color mix is being impacted by any changes being made to one of the six attributes.

11. The method of claim 8 wherein the softkey menu for color adjustment further enables the user to recall colors for loading a color map from a resident color map register, further comprising the step of prompting the user to enter a register number after the user depresses the recall colors softkey and thereafter prompting the user to depress an enter softkey.

12. The method of claim 8 wherein the softkey menu for color adjustment further enables the user to save colors for storing a color map in a resident color map register, further comprising the step of prompting the user to enter a register number after the user depresses the save colors softkey and thereafter prompting the user to depress an enter softkey.

13. The method of claim 8 wherein the softkey menu for color adjustment further enables the user to default colors for loading a color map from a preset color map resident in read only memory.

14. The method of claim 8 wherein the softkey menu for color adjustment further enables the user to select monochrome for loading a color map with shades of green.

15. The method of claim 8 wherein the softkey menu for color adjustment further enables the user to select a special colors menu for providing a softkey menu enabling the user to select one of at least three color maps resident in read only memory, including two color maps optimized for two common visual impairments, respectively, and one color map for a user working in red goggles often found in optics laboratories.

16. The method of claim 8 wherein the softkey menu for color adjustment further enables the user to select an edit colors menu, further comprising the step of prompting the user to enter a pen number corresponding to one of the images displayed on the screen after the user depresses the edit colors key for editing the color in which the selected image appears.

17. The method of claim 16 wherein the user can edit the color of the selected image displayed on the screen to any desired color.

18. A method for enhancing selected images displayed on a screen of a display for an electronic system, the screen comprising a plurality of rows of pixels, each row of pixels comprising a line of the display, wherein the system comprises a microprocessor, which handles all I/O, graphics scaling, and stroke generation functions, and a graphics system processor, which handles raster conversion of vector information into dots on the screen, the two processors being operated asynchronously, with the graphics system processor constantly parsing a vector list and writing dots into a bit map, wherein to avoid any artifacts produced by viewing data on the screen while the graphics system processor is updating the bit map, two separate bit maps are used, one of which is viewed while the other is drawn, the two bit maps being swapped each time the graphics system processor completes one complete scan of the vector list, the method comprising the steps of:

drawing every line of the display once, a start point of a selected image being contained in a first line and an end point of the selected image being contained in a second line; and drawing selected lines of the display a second time, wherein the second time that the selected lines are drawn, the start and the end points are moved one pixel horizontally to an adjacent pixel in the respective rows of pixels containing the start and the end points, respectively;

thereby applying pixel stretching to any selected image on the screen to provide clearer, more refined images.

19. A method for user interaction with a color display for an electronic system, the display comprising a screen that displays a plurality of windows, the system comprising a plurality of instruments wherein instrument states for each of at least two of the plurality of instruments are displayed in respective windows simultaneously, and for adjusting a plurality of colors associated with a plurality of images displayed on the screen of the display, as well as for enhancing selected images displayed on the screen of the display, the screen comprising a plurality of rows of pixels, each row of pixels comprising a line of the display, the method comprising the steps of:

providing an instrument key to initiate a sequence to access at least one of the instruments, whose instrument state is being displayed in one of the plurality of windows, to change instrument settings, the instrument key to facilitate a change in settings of any instrument displayed in any of the windows that appears on the screen, the instrument key being depressed by a user for initiating a sequence for selecting the instrument whose settings are to be changed;

responding to user depression of the instrument key by displaying a first softkey menu having a plurality of user selections corresponding to the instruments whose instrument states appear in the windows displayed on the screen;

responding to user depression of a softkey that appears in the first softkey menu by displaying a second softkey menu having a plurality of user selections corresponding to available settings of the selected instrument;

responding to user depression of a softkey that appears in the second softkey menu by enabling means for adjusting a selected setting of the selected instrument;

providing the user with a third softkey menu for color adjustment, which enables the user to adjust any of six attributes of a color, the attributes comprising red value, green value, blue value, hue, saturation, and luminosity;

responding to user depression of a softkey that appears in the color adjustment softkey menu for enabling means for adjusting a selected attribute of the color;

drawing every line of the display once, a start point of a selected image being contained in a first line and an end point of the selected image being contained in a second line; and drawing selected lines of the display a second time wherein the second time that the selected lines are drawn, the start and the end points are moved one pixel horizontally to an adjacent pixel in the respective rows of pixels containing the start and the end points, respectively;

thereby 1) providing two-stroke access to an instrument displayed in any window displayed on-screen, thus greatly easing the burden of controlling instruments whose instrument states appear in the plurality of windows, 2) enabling the user to select any desired color, and 3) applying pixel stretching to any selected image on the screen to provide clearer, more refined images, so that user interaction with the electronic system through the display is enhanced.

* * * * *